Sept. 2, 1969 C. A. NELSON 3,465,312
BALANCED BIT-SENSE MATRIX
Filed Nov. 19, 1965
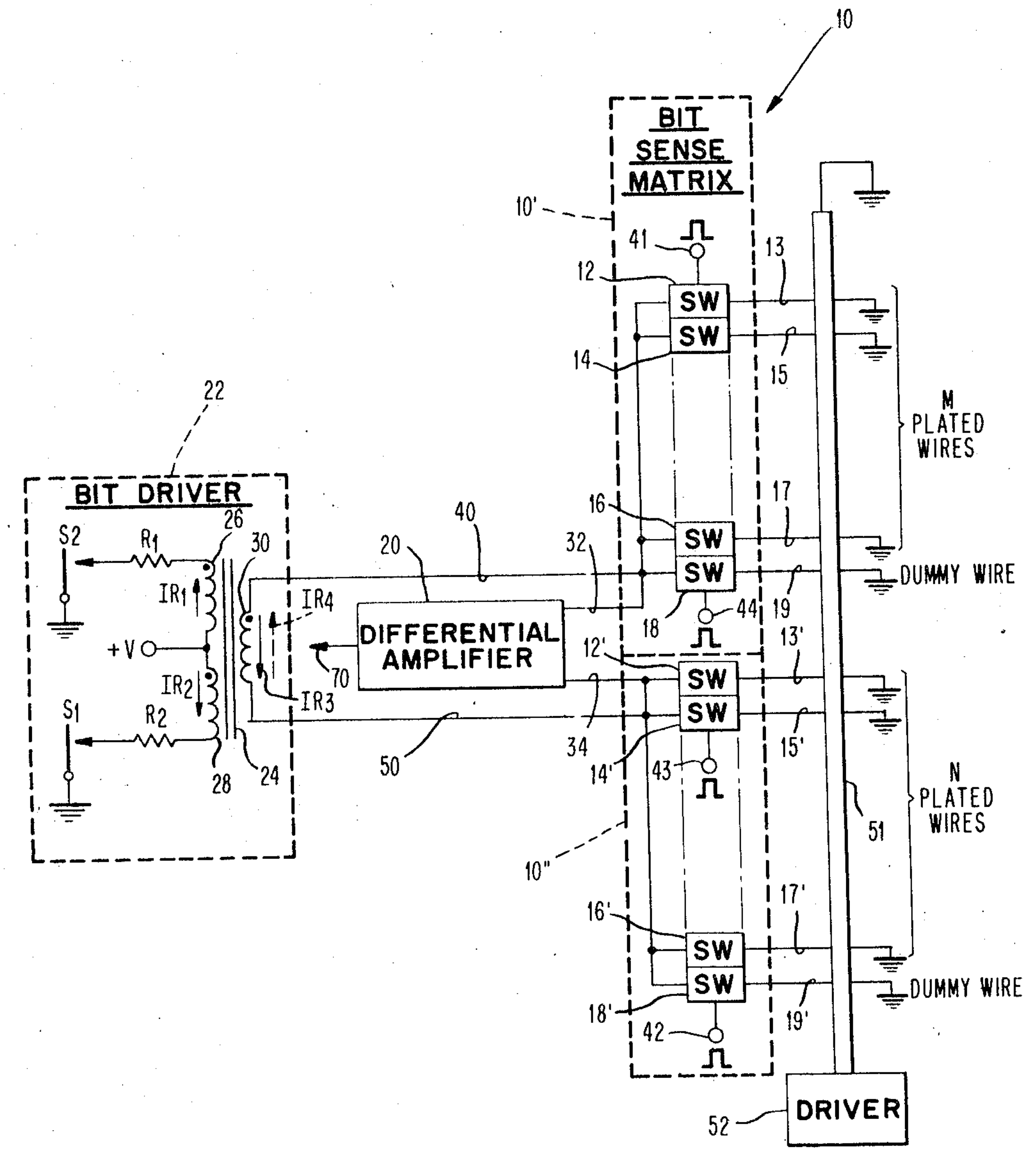
INVENTOR
CHARLES A. NELSON
BY Rene A. Kuypers
ATTORNEY

United States Patent Office 3,465,312

Patented Sept. 2, 1969

3,465,312

BALANCED BIT-SENSE MATRIX

Charles A. Nelson, Philadelphia, Pa., assignor to Sperry Rand Corporation, New York, N.Y., a corporation of Delaware Filed Nov. 19, 1965, Ser. No. 508,695
Int. Cl. G11b 5/74
U.S. Cl. 340—174 10 Claims

ABSTRACT OF THE DISCLOSURE

There is disclosed an invention for selecting a plurality of memory words from a plurality of bits wherein each bit of any word is in a balanced condition for noise. The corresponding bit of any word is balanced by placing an equal number of bits and a dummy bit on each terminal of a differential amplifier.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates in general to memory storage devices and in particular relates to a matrix arrangement for use with plated wire storage elements. In prior known matric selection circuits for use with digital storage elements, a great deal of noise is developed at the input terminals of a sense amplifier during a memory read cycle. Briefly, a matrix selection circuit is utilized, for example, to select one of a plurality of sense or bit lines during a memory read or write cycle. The magnetizable plated wire is selected in order that information may be written onto or read out of the element. Ideally, the selected switch of the matrix selection circuit presents a low impedance for the plated wire memory element when a read or write cycle is required. At the same time, the ideal unselected matrix switches should present an infinite impedance to signals and noise on the plated wire. As a practical manner, this cannot be obtained when semiconductor devices such as transistors are used in the matrix switches. The reason for this is that in the transistor itself there is junction capacitance between the base-collector and the base-emitter junctions. The effect of these capacitances is to allow sneak current to flow between the collector and emitter junction of the unselected transistor switches forming the matrix selection circuit. Other capacitive coupling across the junctions of the unselected transistor switches results from the physical mounting of the transistors and the layout of the circuits. The primary source of noise, however, on the unselected plated wires are caused by the coupling of the voltage swings on the word line into the plated wire. The amount of this coupling is a function of the geometrical relationship of the word line in the plated wire. In other words, the word line is oriented substantially orthogonal and in juxtaposition to the selected as well as unselected plated wires and hence, the closer the word line is to the unselected lines, the greater the capacitive coupling. In a known prior art matrix selection circuit for use with plated wires, each plated wire has a switch between it and the common connection to one of the inputs of a differential amplifier. In a typical arrangement, there may be sixteen switches wherein one of the sixteen switches is selected during a memory cycle wherein as the other fifteen remain unselected. A dummy wire is assigned to the second input of the differential amplifier to provide noise cancellation. The problem encountered with this type of organization is that when all of the sixteen plated wires are assigned to one differential input of the sense amplifier and only the dummy wire to the other differential input, noise coupled to the sense amplifier through the off-impedance of the bit-sense matrix switches causes a noise imbalance.

Accordingly, the instant invention has the following objects: to provide a new and improved matrix selection arrangement; to provide a new and improved balanced bit-sense matrix selection circuitry for use with data storage elements; to provide a bit-sense matrix selection circuit for use with magnetizable plated wires; to provide a new and improved technique for writing information into a balanced bit-sense matrix selection circuitry. Other objects and advantages of this invention will become apparent to those of ordinary skill in the art from the references to the following detailed description of the exemplary embodiments of the apparatus in the appended claims. The various features of the exemplary embodiments according to the invention may be best understood with references to the accompanying drawing wherein is illustrated the balanced bit-sense matrix selection circuit of the instant invention. The drawing further illustrates the novel bit driver arrangement for use with a balanced bit-sense matrix selection circuit.

Referring now to the drawing, there is depicted a balanced bit-sense matrix 10. The balanced bit-sense matrix 10 is essentially composed of two equal or balanced sections 10′ and 10″ sections wherein the first section 10′ comprises selection circuits or switches 12, 14, 16 and 18. It should be understood that there may be a plurality of such swtches and only four are shown for purposes of simplicity. Associated with the respective switches 12, 14 and 16 are the plated wires 13, 15 and 17. Although the invention is described with reference to plated wires, other types of memory elements might readily be substituted without departing from the spirit of this invention. The switch 18 is associated with a dummy wire 19. The dummy wire 19 is conventionally a copper wire which has no magnetic material plated thereon.

The lower section 10″ of the bit-sense matrix 10 incorporates an equal number of switches as does the upper section 10′. Thus, the switches 12′, 14′, 16′ and 18′ are shown respectively associated with the plated wires 13′, 15′ and 17′ and the dummy 19′. The switches 12, 14, 16 and 18 are shown common connected to the input 32 of the differential amplifier 20 (i.e., sense amplifier) as well as to one side of the secondary winding 30 of the transformer 24 via the conductor 40. In like manner, the switches 12′, 14′, 16′ and 18′ are common connected to the second input 34 of the differential amplifier 20 as well as to the other side of the secondary winding 30 of the transformer 24 via the conductor 50. It should therefore be readily apparent from the above description that the bit-sense matrix 10 is balanced insofar as there are an equal number of switches and plated wires including a dummy wire connected to one side of the differential amplifier 20 as there are switches and plated wires including a dummy wire connected to the second input of the differential amplifier.

In operation, a particular plated wire in either the upper or lower section 10′, 10″ of the bit-sense matrix 10 is selected for a memory read or write cycle. This is accomplished by causing any of the matrix switches 12, 12′, etc, to be energized. In the unenergized state, the individual switches present a high impedance to current flow. By selectively energizing the required switch associated with a particular plated wire, the switch becomes a low impedance so that a memory read or write cycle can be initiated. A matrix selection circuit for use in the bit-sense matrix 10 has been fully described in the co-pending patent application having a Ser. No. 375,522, filed June 16, 1964 by Carlos F. Chong and Charles A. Nelson now U.S. Patent 3,405,399.

The balanced bit-sense matrix 10 operates so that when any one of the switches in a section 10′ or 10″ is switched into the low impedance state the dummy wire in the remaining section of the bit-sense matrix 10 is simultaneously energized therewith. By way of example, if it is desired to provide a low impedance state for the plated wire 13, the switch 12 is energized by the signal 41 and simultaneously the switch 18′ associated with the dummy wire 19′ will be simultaneously energized by the signal 42. In like manner, if it is desired to provide a low impedance state for the plated wire 15′ the switch 14′ is energized via the signal 43 and the switch 18 associated with the dummy wire 19 is simultaneously energized by the signal 44. As will become apparent hereinafter, the symmetrical assignment of matrix switches and plated wires and dummy wires allows the off-impedance coupled noises to be in balance and to be rejected by the differential amplifier 20. Thus, the sources of noise which are developed at the input terminals 32 and 34 of the differential amplifier 20 are caused, as mentioned above, by sneak currents between the collectors and the emitters due to junction capacitance, the physical mounting of the transistors in the layout of the circuits as well as capacitance coupling of word line noise through the unselected matrix switches. These noise sources are substantially uniform in the upper and lower sections 10′ and 10″ of the bit-sense matrix 10 so that these noises are considered to be in balance.

Let us assume that the read operation is to be performed at a single bit location along the plated wire 15′ at the intersection of the strap or word line 51. Accordingly, the strap 51 is energized by the driver circuit 52. Prior to the energizing of the strap 51, the switch 14′ is conditioned to the low impedance state by means of the signal 43. At the same time the switch 18 becomes a low impedance when energized by the signal 44. Accordingly, a voltage is induced in the plated wire 15′ whose polarity is depended whether a binary "0" or a binary "1" is stored at the bit location. Let us assume for the sake of discussion that the particular bit stored at the bit location induces a positive signal in plated wire 15′. This positive signal will be connected to the terminal 34 of the amplifier 20, since the switch 14′ becomes a low impedance circuit as previously described. In addition to the signal induced in the plated wire 15′, a noise signal accompanies the positive induced signal. The noise accompanying the signal is due primarily to the energizing of the word line 51. In the upper section 10′ of the sense matrix 10, the energizing of the switch 18 causes a noise signal alone resulting from the word line 51 to be connected to the terminal 32 of the amplifier 20. In addition to the word line noise there is noise that is applied to terminals 32 and 34 of the amplifier 20 which passes through the unselected matrix switches. Thus, noise passes through the unselected switches 12, 14 and 16 in the section 10′ and through the unselected switches 12′, 16′ and 18′ of the section 10″. In other words, substantially the same noise is developed in the upper sections of the bit-sense matrix 10 as is developed in the lower section except that the lower section is accompanied by the positive signal which is to be sensed. Accordingly, the output 70 of the differential amplifier 20 provides a difference signal between the signals appearing at terminals 32 and 34. Assuming the signal at terminal 34 is subtracted from the signal on terminal 32, the noise which is developed on the upper and lower sections of the bit-sense matrix 10 is cancelled and the positive induced signal results in a negative induced signal which is present at the output of the differential amplifier 20 substantially free of noise. The positive signal at the output terminal 70 of amplifier 20 indicates that a binary "1" is stored at the bit position along plated wire 15.

It should be noted that if a binary "1" were stored along any plated wire in the upper section 10′ of the bit sense matrix 10, the positive induced signal which occurs during a read-out cycle would appear accompanied by sense matrix 10, the positive induced signal which occurs noise at input terminal 32 of the amplifier 20. A noise signal alone would also appear at terminal 34 of the amplifier 20. Since differential amplifier 20 operates so that the signal on terminal 34 is subtracted from the signal on terminal 32, it is readily apparent that the output signal at terminal 70 remains positive. In other words, a binary "1" will have different polarity signals depending upon whether it is read in the upper section 10″ or the lower section 10″ of the bit-sense matrix 10. This type of arrangement requires additional logic circuitry outside of the amplifier 20 to interpret the significance of the different polarity signals as to whether a binary "1" or "0" is stored in a memory location. In order to eliminate additional complexity at the output of the sense amplifiers, the following simple technique has been devised.

It will be recalled that information is written into a bit location (the intersection of the drive strap 51 and any one of the plated wires) when the word current flowing in the strap 51 and the steering bit current flowing in a particular plated wire are substantially coincident. Thus, when the bit steering current flows in one direction, the magnetization vectors located at the particular bit location and which have been rotated to an angle less than 90 degrees by the word current, are steered in such a manner by the tilt current and upon release of the two currents, the vectors will be oriented in one reference position e.g. clockwise around the circumference of the plated wire. On the other hand, when the bit steering current flows to the plated wire in the other direction, upon release of the two currents the vectors will be oriented in a second reference position (i.e., counterclockwise) around the circumference of the plated wire. The bit steering current necessary for recording information at a bit position along any plated wire is supplied by the bit driver 22. Current supplied by the bit driver 22 is transformer coupled by the transformer 24 before being supplied to the required plated wire.

The use of the transformer 24 in conjunction with the bit driver 22 overcomes the polarity problem discussed above when used with the balanced bit-sense matrix selection circuit. This is accomplished by recording the same binary information (e.g. a "0") with opposite steering currents in the upper and lower portions 10′ and 10″ of the bit sense matrix. For example, a binary "1" is written at the bit position provided by the plated wire 13 and strap 51 with a positive bit steering current whereas a binary "1" is written at the bit location provided by the plated wire 13′ and strap 51 with a negative bit steering current. The particular binary information to be written is determined by which switch, S1 and S2 is closed. Closing one of the switches of the bit driver 22 causes a positive current to flow in the upper section 10′ of the matrix 10 and a negative current to flow in the lower section 10″ of the matrix. Similarly, closing the other switch causes a negative current to flow in the upper section 10′ and a positive current to flow in the lower section 10″.

Let us assume that it is required to write a binary "1" in the bit location provided by the strap 51 in the plated wire 13 and a binary "1" is represented by a clockwise orientation around the easy axis as viewed from the ground side thereof. Accordingly, switch S2 of the bit driver 22 is energized thereby causing the current IR1 to flow from the potential +V to ground via the resistor R1 and the primary winding 26 of the transformer 24. In accordance with the dot convention shown for the transformer 24, a current IR3, which may be considered as positive, flows in a direction from the ground terminal of the plated wire 13 through the switch 12 (in the low impedance state) to the bit-sense matrix 10 through leads 40 and 50 and through the secondary winding 30. The circuit is completed to ground through the switch 18′ (in the low impedance state) connected to the dummy wire 19′. The bit steering current IR3 causes the bit location (the intersection of plated wire 13 and the strap 51) to be magnetized in the clockwise direction. In the event that it were required to write a binary "1" in the bit position identified by the intersection of the plated wire 13' and the strap 51 in the lower section 10'' of the bit sense matrix 10, S2 would again be closed so that the current IR3 again is developed in the primary winding 26 and secondary winding 30 of the transformer 28 in the manner just described. This current flows in a direction from ground at the end point of the dummy wire 19 through the switch 18, (in the low impedance state) the conductors 40 and 50, the switch 12' and through the plated wire 13' to ground. This current direction is considered as being negative. Accordingly, the magnetization vectors at the bit location along plated wire 13' is switched to the counterclockwise direction as viewed from ground terminal thereof. In other words, a binary "1" written in the upper half 10' of the bit-sense matrix 10 is written oppositely (i.e., with a clockwise orientation) from a binary "1" written in the lower half 10'' of the bit-sense matrix 10 (i.e., with a counterclockwise orientation).

The read out of the binary "1" located in the upper half of the bit-sense matrix 10 will have an opposite polarity from the binary "1" located in the lower half of the sense matrix 10. This may be shown in the following manner. During a read out cycle operation, strap 51 is energized by the driver 52. If it is required to read out the binary "1" located along the plated wire 13, the switch 12 is put in a low impedance state by means of the energizing pulse 41. In like manner, the switch 18' connected to the dummy wire 19' is put in a low impedance state by means of the energizing pulse 42. Accordingly, the vector oriented as a binary "1" is rotated to an angle less than 90° from its preferred easy axis of magnetization. Accordingly, there is radial reduction of flux (i.e., in a clockwise direction) by this rotation so that a voltage is induced in the plated wire 13 which opposes this flux reduction in accordance with Lenz's Law. Hence, a voltage is induced in plated wire 13 which causes current to flow in a direction from ground to switch 12 and into terminal 32 of the differential amplifier 20. In other words, the terminal 32 detects a positive voltage including noise, whereas terminal 34 has a noise signal only imposed thereon. Consequently, the differential amplifier 20 produces a positive signal at the output terminal 70 due to the fact that the noise signal at terminal 34 subtracted from the positive signal including noise at terminal 32.

On the other hand, if it is required to read a binary "1" located along the plated wire 13', strap 51 would again be energized by the driver 52. In order to read out the "1" information bit along plated wire 13, the switch 12' is energized by a signal similarly to signal 43 so that it is put in low impedance condition. At the same time the switch 18 is conditioned to the low impedance state by the signal 44. Since the "1" located along the plated wire 13' is oriented in a counterclockwise direction as viewed along the plated wire from the ground terminal, there is a radial reduction of flux (i.e., in the counterclockwise direction) when the strap 51 is energized by the driver 52 due to the rotation of the magnetization vectors. Accordingly, voltage is induced in the plated wire 13' which will oppose this flux reduction in the counterclockwise direction, in accordance with Lenz's Law. This induced voltage will produce a current which will flow from the terminal 34 of the differential amplifier 20 through the switch 12', through the plated wire 13' to ground. Therefore, the polarity at the induced signal including noise at the terminal 34 of the amplifier 20 is negative. Since the terminal 32 of the amplifier 20 is connected via the low impedance switch 18 to the dummy wire 19, a noise signal is produced thereat. However, since the signal at terminal 34 is algebraically subtracted from the signal at the terminal 32, the signal at the output terminal 70 is of positive polarity. The noise however at terminal 34 is subtracted from terminal 32. Hence, the binary "1" read out along plated wire 13' has a positive polarity as does the binary "1" read on the plated wire 13. Consequently, although the information in the upper and lower section 10', 10'' of the bit-sense matrix 10 is written in with opposite bit steering currents, the same binary information is read out with the same polarity at the output terminal of the sense amplifier 20. It should be readily apparent that information may be written into the memory arrangement in an oppposite manner from that discussed above by closing switch S1.

The explanation in regard to the figure, it should be understood, has been described for a single bit of a word for ease of understanding. In a complete memory plane, there would be, for example, in a nine bit word arrangement, nine circuits similar to that depicted. The word line 51 would therefore be positioned over all wires comprising the nine circuits. By means of the switches such as 14 and the long drive line 51, as many words can be obtained as there are wires 13. It can be appreciated that the number of words multiply for each drive strap added to the memory plane.

In summary, this invention provides a symmetrical matrix selection circuit arrangement for use with data storage elements which reduces the noise in the detector due to capacitive coupling of the word line noise through unselected matrix switches as well as noise through selected switches. The symmetrical assignment of the plated wire and dummy wires allows the above developed noises to be in balance and to be rejected by the differential amplifier.

The embodiments of the invention in which an exclusive property or privilege is claimed are defined as follows:

1. The combination comprising:

(A) a detector means having first and second input terminals;

(B) a first plurality of sensing means wherein each sensing means is coupled to said first input terminal through a switching means;

(C) a second plurality of sensing means wherein each sensing means is coupled to said second input terminal through a switching means;

(D) data storage means coupled along every position of said sensing means;

(E) at least one drive line coupled to said first and second plurality of sensing means; the intersection of said drive line and each sensing means including said data storage means defining a bit location whereat binary information is stored;

(F) a single bit driver coupled to said first and second plurality of sensing means.

2. The combination in accordance with claim 1 wherein said detector means is a differential amplifier.

3. The combination in accordance with claim 1 wherein said first and second plurality of sensing means includes, respectively, a single non-memory element.

4. The combination in accordance with claim 3 wherein each said non-memory element of said first and second groups are respectively connected to a switching circuit.

5. The combination is accordance with claim 3 wherein said respective memory elements coupled to a sensing means comprise a magnetizable wire and said non-memory element comprises a non-magnetizable wire.

6. The combination in accordance with claim 5 wherein said magnetizable wire comprises a copper-beryllium substrate having a magnetic coating which has the property of uniaxial anisotropy.

7. The combination in accordance with claim 3 wherein said non-memory element comprises a copper wire.

8. The combination in accordance with claim 4 wherein means are coupled to said respective switching circuits to simultaneously select one of said wires of said first group with said non-memory element of said second group and in the alternative, to select one of said wires of said second group with said non-memory element of said first group.

9. The combination in accordance with claim 3 wherein said bit driver coupled to said first and second plurality of memory elements transmits digit currents such that said digit current is transmitted in a first direction to said plurality of memory elements and in a second direction to said second plurality of memory elements in order to record the same information.

10. The combination in acocrdance with claim 9 wherein said last mentioned means includes a transformer.

References Cited

UNITED STATES PATENTS

| | | | |
|---|---|---|---|
| 2,988,732 | 6/1961 | Viral | 340—174 |
| 3,209,337 | 9/1965 | Crawford | 340—174 |

BERNARD KONICK, Primary Examiner

GARY. M. HOFFMAN, Assistant Examiner